United States Patent
Thomas

(10) Patent No.: US 6,705,213 B1
(45) Date of Patent: Mar. 16, 2004

(54) SMOKE GENERATOR FOR FOOD PROCESSING

(76) Inventor: Thomas A. Thomas, 1399 SW. 30th Ave. Bay 8, Boynton Beach, FL (US) 33426

(*) Notice: Subject to any disclaimer, the term of this patent is extended or adjusted under 35 U.S.C. 154(b) by 0 days.

(21) Appl. No.: 10/425,125

(22) Filed: Apr. 28, 2003

(51) Int. Cl.[7] ................................. A23L 1/01
(52) U.S. Cl. .............................. 99/482; 99/467
(58) Field of Search .................... 99/467, 481–483, 99/339, 340, 444–450, 399, 516, 480; 426/235, 314, 315; 126/25 R, 25 A, 59.5, 79; 131/329, 330, 185, 200; 110/108, 102, 118, 196; 206/525, 524.6

(56) References Cited

U.S. PATENT DOCUMENTS

| | | | |
|---|---|---|---|
| 2,984,171 A | * 5/1961 | Lee, Sr. .................... 99/352 |
| 3,347,148 A | 10/1967 | Williams | |
| 4,130,052 A | * 12/1978 | Jacobson .................... 99/339 |
| 4,270,464 A | 6/1981 | Kerres | |
| 4,436,100 A | 3/1984 | Green | |
| 4,467,709 A | * 8/1984 | Anstedt .................... 99/482 |
| 4,934,272 A | 6/1990 | Sternin | |
| 4,979,436 A | * 12/1990 | McGowan .................... 99/340 |
| 5,193,445 A | * 3/1993 | Ferguson .................... 99/482 |
| 5,355,782 A | 10/1994 | Blanchard | |
| 5,467,692 A | * 11/1995 | Perez, III .................... 99/340 |
| 6,102,028 A | 8/2000 | Schlosser | |
| 6,257,130 B1 | 7/2001 | Schlosser | |
| 6,481,344 B1 | * 11/2002 | Green et al. .................... 99/482 |

* cited by examiner

Primary Examiner—Timothy Simone
(74) Attorney, Agent, or Firm—Alvin S. Blum

(57) ABSTRACT

A smoke generator has an air pump with control valve to supply a continuous controllable air supply to a smoking fuel on a grid in a fire box. Smoke is directed to the food processor from a smoke output within the fire box and above the grid. A chimney extends from the top of the fire box. It is filled with fuel. This fuel is fuel is not in the air stream, so it does not burn. As fuel on the grid is consumed, fuel from the chimney drops onto the grid. This provides a continuous feed of fresh so that the device can generate a uniform controllable stream of smoke over a long period of time unattended. A disposable fuel cartridge is also provided for ease of use.

17 Claims, 3 Drawing Sheets

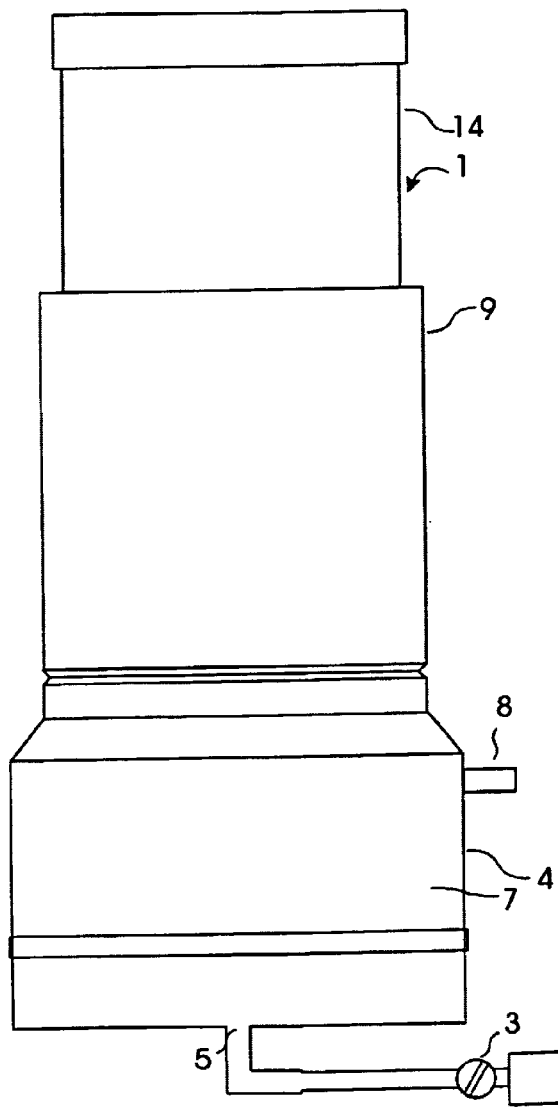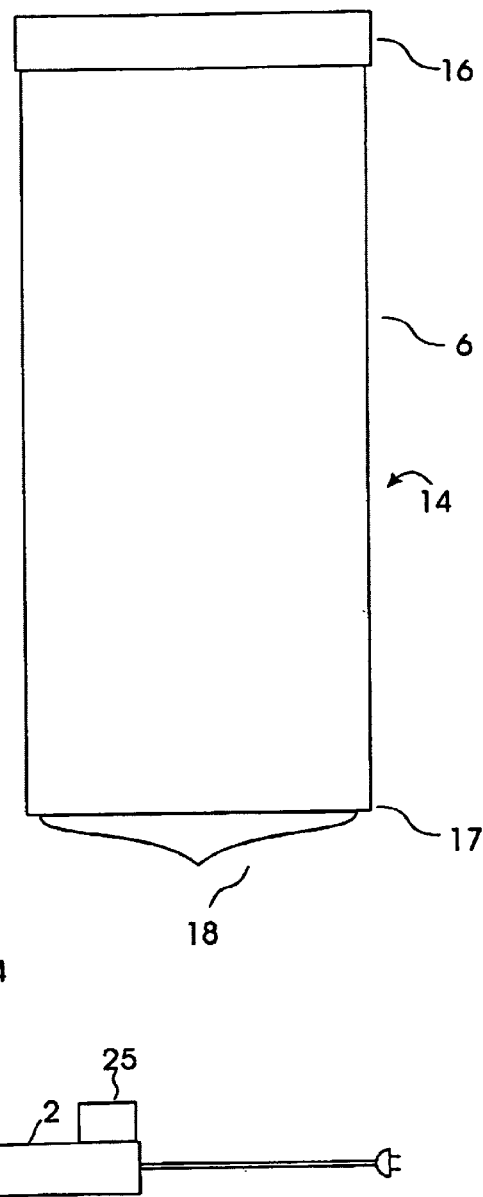

SMOKE GENERATOR FOR FOOD PROCESSING

This invention relates to processing foods, and more particularly to apparatus for generating a continuous supply of smoke for hot or cold smoking of food.

BACKGROUND OF THE INVENTION

When preparing food, such as on a barbecue grill, it is well known to add wetted wood chips to the fire to generate smoke that enhances the flavor of the food. As the wet wood smolders, it generates smoke, and also dries out. The dry wood then burns with little or no smoke. U.S. Pat. No. #3,347, 148 issued Oct. 17, 1967 to Williams discloses a wood chips packed cylinder made of a fine metal mesh that acts as a flame arrester to prevent the wood from bursting into flames. No facilities are provided for refilling the cylinder. U.S. Pat. No. 4,934,272 issued Jun. 19, 1990 to Stemin et al. discloses a combustible cylinder made of rice paper packed with sawdust of a particular particle size that is designed to smolder like a cigar, independent of the heat from the barbecue. The cylinder is designed to burn from one end to the other suspended in a ring. The entire cylinder is within a moving air stream with the air then moving into the barbecue.

It is difficult to get a controlled uniform smoke emission over a period of time from the apparatus of the prior art, and to add fuel while in continuous operation.

SUMMARY OF THE INVENTION

It is accordingly an object of the invention to provide a smoke generator with an automatic continuous feeding of fuel to generate a stream of smoke that is substantially uniform with time and controllable. The smoker includes a fire chamber with a fire box having a grid for holding the burning fuel. A supply of forced air is fed in below the grid. A smoke outlet above the grid passes the smoke stream out to a food smoker. The smoker may use hot smoking or cool smoking since the smoke generator is separate from the food processor. A chimney member extends upward from the firebox. It is filled with a supply of smoke generating fuel such as wood chips or wood pellets. The fuel in the chimney drops down onto the grid as fuel is consumed. This ensures a continuous supply of fuel over time so that the smoker will supply a controllable, continuous, and substantially uniform supply of smoke without operator action. A disposable fuel cartridge may be provided to facilitate fuel loading. These and other objects, features, and advantages of the invention will become more apparent when the detailed description is studied in conjunction with the drawings in which like elements are designated by like reference characters in the various drawing figures.

BRIEF DESCRIPTION OF THE DRAWINGS

FIG. 1 is a side elevation view of an embodiment of the invention.

FIG. 4 is a side elevation view of a fuel cartridge of the invention.

DETAILED DESCRIPTION OF PREFERRED EMBODIMENTS

Figures 2, 3:
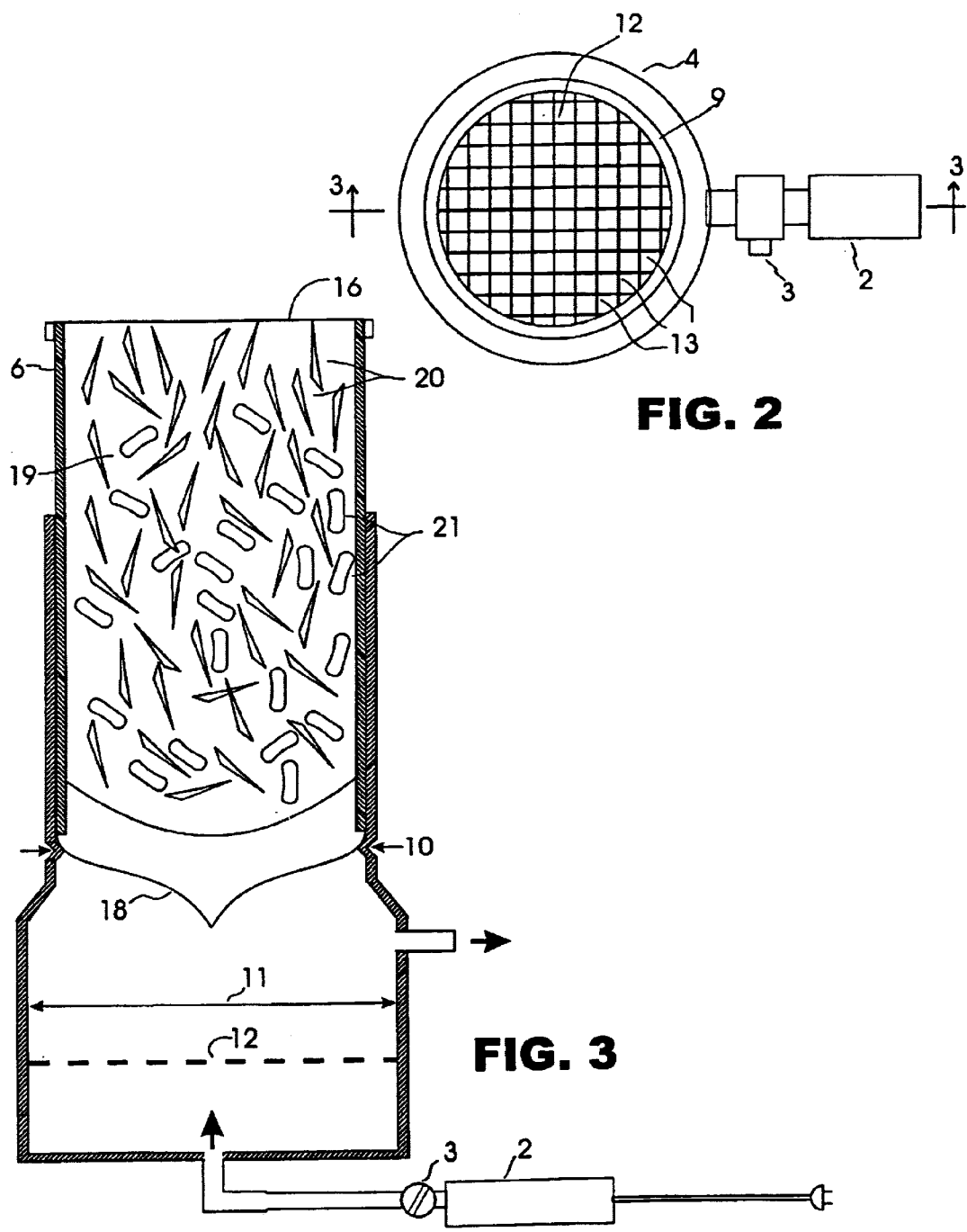
FIG. 2 is a top view of the embodiment of FIG. 1 with fuel cartridge removed.
FIG. 3 is a sectional view taken through line 3—3 of FIG. 2.

Referring now to the drawing FIGS. 1–4, a smoke generator 1 of the invention includes an air pump 2 that may be of the low volume vibratory type 25 used for fish tanks with a flow controller valve 3. Air input pipe 5 may be rigid and permits air and vibrations from the pump to be transmitted to the fire resistant chamber 4. Chamber 4 includes a fire box 7, a grid 12 above the air input 5, a smoke output 8 above the grid, and a chimney member 9 above the smoke output 8. The grid has openings 13 large enough to pass ashes when fuel burning on the grid is consumed. The opening are small enough to retain the burning fuel until it is consumed.

An elongate cylindrical disposable fuel cartridge 14 has a low flammability outer wall 6, such as a cardboard tube. The top end 16 is closed to air flow. The cartridge is filled with fuel 19 that emits a desirable smoke, such as wood chips 20 and/or wood pellets 21. The bottom end 17 is closed off with a starter material 18 that serves a dual purpose. It retains the fuel inside the cartridge until it is burned away, and it is easily set afire to start the fuel burning. The starter material may be of various composition well known in the art, such as paper pulp with oxidizer, punk, and makko. It is molded into a plug to retain the fuel during shipping and handling. The external dimensions 15 of the cartridge are made to fit snugly into the inside dimensions 10 of the chimney member. Air to feed the combustion of the fuel travels through the grid into fuel on the grid, then out through the smoke output 8. Consequently, air does not get to fuel higher up in the chimney member. It does not bum until fuel below it has been consumed. This provides a mechanism for continuous feed of the fuel into the fire box, without any complex machinery. Vibrations from the pump may facilitate dropping of fuel from the cartridge into the fire box. The result is a continuous, relatively constant supply of smoke to the food. When the cartridge is consumed, it may be replaced with another while the fuel is still burning and the smoke is being continuously generated. The dimensions of the fire box may be greater than that of the chimney member to prevent blocking of the smoke output 8. A constriction 10 of the chimney member 9 holds the cartridge from falling into the fire box.

Figure 5:
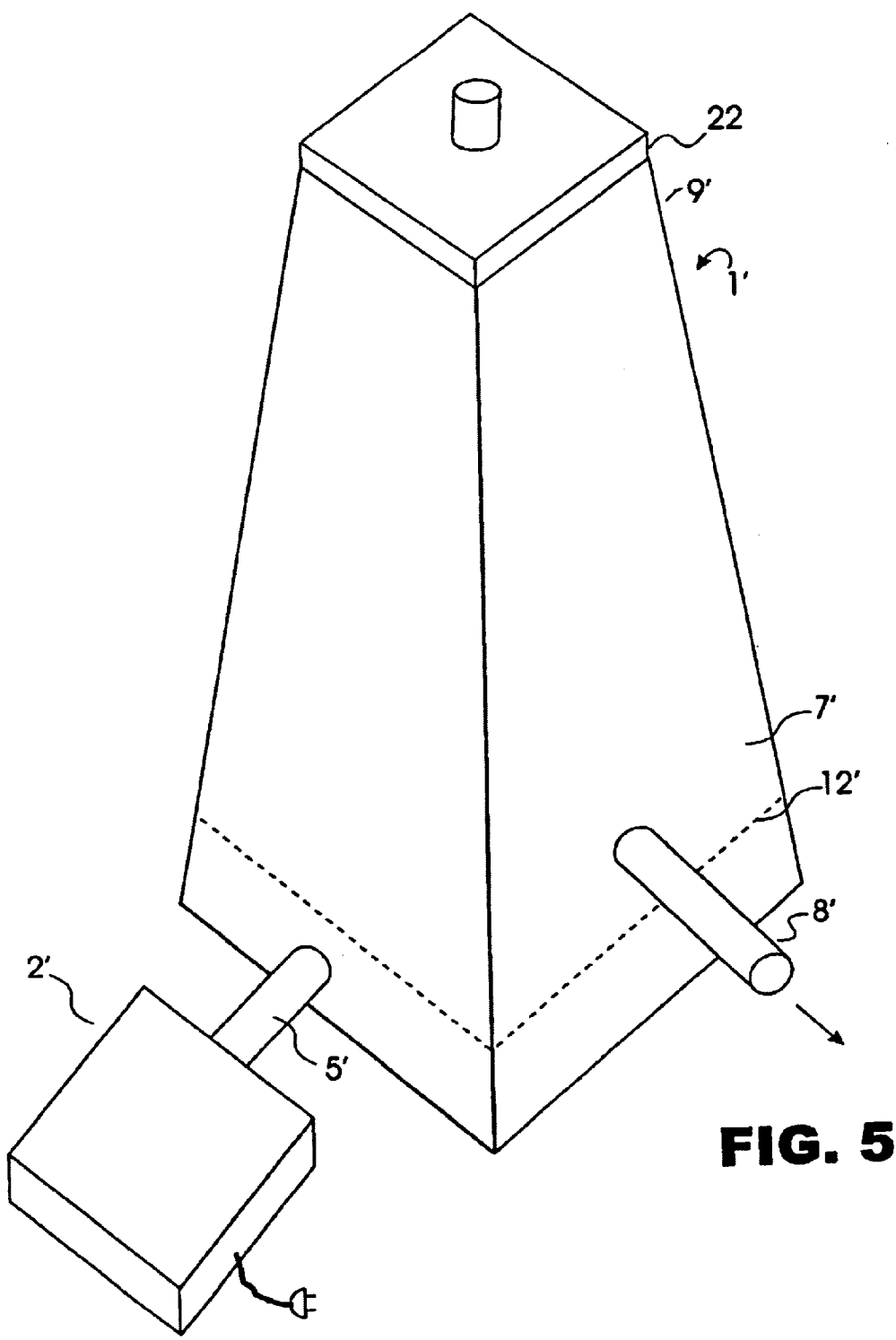
FIG. 5 is a perspective elevation view of another embodiment of the invention.

Referring now to FIG. 5, another smoke generator 1' of the invention is shown that does not use a replaceable fuel cartridge. The tubular chimney member portion 9' has a removable top cover 22. This is removed and some burning wood chips are dropped into the chimney member. They rest upon the grid 12'. Fuel in the form of wood chips, wood pellets, and the like are then put into the chimney and the cover 22 replaced. By closing off the top of the chimney member, air is kept away from the fuel in the chimney. Without air, it cannot burn. It only burns when it drops down into the air stream in the fire box. Air from the air pump 2' passes into the fire box 7' through input 5', through grid 12', fuel on the grid, and out smoke output 8'. As fuel is consumed, fresh unburned fuel passes from the chimney member down onto the fire box to be burned. This provides a continuous source of fuel to enable the device to generate a continuous, substantially uniform supply of smoke.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A smoke generator for providing a controlled flow of smoke to a barbecue apparatus from a smoking fuel, the smoke generator comprising:

a) an air pump with a flow controller providing a controlled air flow;

b) a fire resistant chamber having an air input connected to the air flow, a smoke output, a fire box, and a chimney member;
c) a grid mounted within the fire box above the air input and below the smoke output, the grid having openings small enough to retain the smoking fuel and large enough to pass ash from the burned fuel therethrough;
d) the chimney member extending upward from the fire box above the smoke output, the chimney member being a cylinder with an internal transverse cross section less than that of the fire box; and
e) an elongate cylindrical fuel cartridge having an external cross section constructed for snug fitting within the chimney member, a closed top end, a body filled with fuel that produces a desirable smoke when burning, and a bottom end provided with a starter material that burns readily and serves as a fire starter, the starter material holding the fuel within the cartridge until the starter material is burned.

2. The smoke generator according to claim 1 in which the fuel includes wood chips.

3. The smoke generator according to claim 1 in which the fuel includes wood pellets.

4. The smoke generator according to claim 1 in which the starter material includes punk.

5. The smoke generator according to claim 1 in which the starter material includes makko.

6. The smoke generator according to claim 1 in which the starter material includes paper pulp.

7. The smoke generator according to claim 1 in which the air pump includes a vibratory element and connections between the pump and the chamber enable vibrations from the vibratory element to be transmitted to the chimney member to facilitate feeding of the fuel into the fire box.

8. A smoke generator for providing a controlled flow of smoke to a barbecue apparatus from, a an air pump with a flow controller providing a controlled air flow, the smoke generator comprising:

a) a fire resistant chamber having an air input connected to the air flow, a smoke output, a fire box, and a tubular chimney member;
b) a grid mounted within the fire box above the air input and below the smoke output, the grid having openings small enough to retain the smoking fuel and large enough to pass ash from the burned fuel therethrough;
c) the tubular chimney member extending upward from the fire box above the smoke output for storing a supply of fuel to be fed into the fire box as fuel in the fire box is consumed; and d) a closure for removably closing the chimney member top after the chimney is supplied with fuel so that air will pass only through the fuel in the fire box between the grid and the smoke output to prolong the smoking action as the fuel in the fire box burns, and fresh unburned fuel is slowly fed from above.

9. The smoke generator according to claim 8 in which the fuel includes wood chips.

10. The smoke generator according to claim 8 in which the fuel includes wood pellets.

11. The smoke generator according to claim 8 in which the air pump includes a vibratory element and connection between the pump and the chamber enable vibrations from the vibratory element to be transmitted to the chimney member to facilitate feeding of the fuel into the fire box.

12. In a smoke generator for providing a controlled flow of smoke to a barbecue apparatus from an air pump with a flow controller providing a controlled air flow, the smoke generator; having a fire resistant chamber with an air input connected to the air flow, a smoke output, a fire box, and a chimney member, a grid mounted within the fire box above the air input and below the smoke output, the grid having openings small enough to retain the smoking fuel and large enough to pass ash from the burned fuel therethrough, the chimney member extending upward from the fire box above the smoke output, the chimney member being tubular with an internal transverse cross section less than that of the fire box, the improvement comprising:

an elongate fuel cartridge having a low flammability tubular outer wall with an external cross section constructed for snug fitting within the chimney member, a closed top end, a body filled with fuel that produces a desirable smoke when burning, and a bottom end provided with a starter material that burns readily and serves as a fire starter, the starter material holding the fuel within the cartridge until the starter material is burned.

13. The smoke generator according to claim 12 in which the fuel includes wood chips.

14. The smoke generator according to claim 12 in which the fuel includes wood pellets.

15. The smoke generator according to claim 12 in which the starter material includes punk.

16. The smoke generator according to claim 12 in which the starter material includes makko.

17. The smoke generator according to claim 12 in which the starter material includes paper pulp.

\* \* \* \* \*